United States Patent
Tsirkin

(10) Patent No.: US 9,766,918 B2
(45) Date of Patent: Sep. 19, 2017

(54) VIRTUAL SYSTEM DEVICE IDENTIFICATION USING GPU TO HOST BRIDGE MAPPING

(71) Applicant: Red Hat Israel, Ltd., Raanana (IL)

(72) Inventor: Michael S. Tsirkin, Yokneam Illit (IL)

(73) Assignee: Red Hat Israel, Ltd., Raanana (IL)

( * ) Notice: Subject to any disclaimer, the term of this patent is extended or adjusted under 35 U.S.C. 154(b) by 7 days.

(21) Appl. No.: 14/629,365

(22) Filed: Feb. 23, 2015

(65) Prior Publication Data

US 2016/0246629 A1    Aug. 25, 2016

(51) Int. Cl.
*G06F 13/40* (2006.01)
*G06F 9/455* (2006.01)

(52) U.S. Cl.
CPC ...... *G06F 9/45558* (2013.01); *G06F 13/4027* (2013.01); *G06F 9/455* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 5,857,086 A * | 1/1999 | Horan | G06F 13/4027 345/503 |
| 7,293,129 B2 | 11/2007 | Johnsen et al. | |
| 7,619,629 B1 * | 11/2009 | Danilak | G06F 15/167 345/502 |
| 8,032,883 B2 | 10/2011 | Nakajima | |
| 8,161,209 B2 * | 4/2012 | Morein | G06F 13/4265 340/2.1 |
| 8,200,796 B1 * | 6/2012 | Margulis | G06F 3/1431 709/217 |
| 8,410,994 B1 * | 4/2013 | Testa | G06F 3/14 345/1.3 |
| 9,436,493 B1 * | 9/2016 | Thomas | G06F 9/4401 |
| 9,495,723 B2 * | 11/2016 | Currid | G06T 1/20 |
| 2007/0050765 A1 | 3/2007 | Geisinger | |
| 2007/0139422 A1 * | 6/2007 | Kong | G09G 5/363 345/502 |
| 2009/0119087 A1 * | 5/2009 | Ang | G06F 9/45558 703/23 |
| 2009/0119684 A1 * | 5/2009 | Mahalingam | G06F 9/45558 719/324 |

(Continued)

FOREIGN PATENT DOCUMENTS

WO    2013091185    6/2013

OTHER PUBLICATIONS

Dowty et al, GPU Virtualization on VMware's Hosted I/O Architecture, 2008, WIOV'08, pp. 73-82.*

(Continued)

*Primary Examiner* — Abu Ghaffari
(74) *Attorney, Agent, or Firm* — Lowenstein Sandler LLP

(57) ABSTRACT

A hypervisor identifies a physical GPU device accessible by the hypervisor to be assigned to a virtual machine and retrieves a GPU device identifier from the physical GPU device. The hypervisor then determines a host bridge device identifier that corresponds to the retrieved GPU device identifier using a mapping table that maps a plurality of GPU device identifiers to a corresponding plurality of host bridge device identifiers.

20 Claims, 5 Drawing Sheets

(56) References Cited

U.S. PATENT DOCUMENTS

| | | | |
|---|---|---|---|
| 2009/0273603 A1* | 11/2009 | Johnson | G06F 15/17337 345/504 |
| 2010/0149194 A1* | 6/2010 | Yu | G06F 8/45 345/505 |
| 2010/0262722 A1* | 10/2010 | Vauthier | G06F 3/14 710/8 |
| 2011/0063306 A1* | 3/2011 | Diard | G06F 9/455 345/503 |
| 2011/0102443 A1 | 5/2011 | Dror et al. | |
| 2011/0145916 A1* | 6/2011 | McKenzie | G06F 21/83 726/19 |
| 2012/0054740 A1* | 3/2012 | Chakraborty | G06F 9/45558 718/1 |
| 2012/0081355 A1* | 4/2012 | Post | G06T 15/005 345/419 |
| 2012/0254439 A1* | 10/2012 | Yamasaki | G06F 9/505 709/226 |
| 2012/0266165 A1 | 10/2012 | Cen et al. | |
| 2013/0091500 A1* | 4/2013 | Earl | G06F 9/4555 718/1 |
| 2013/0174144 A1* | 7/2013 | Cheng | G06F 9/45558 718/1 |
| 2013/0238785 A1* | 9/2013 | Hawk | G06F 9/5072 709/224 |
| 2013/0304903 A1* | 11/2013 | Mick | H04L 43/0817 709/224 |
| 2014/0006225 A1* | 1/2014 | Bowman | G06Q 10/087 705/28 |
| 2014/0181806 A1* | 6/2014 | Abiezzi | G06F 9/45558 718/1 |
| 2014/0181807 A1* | 6/2014 | Fonseca | G06F 9/5083 718/1 |
| 2014/0189690 A1 | 7/2014 | Ramakrishnan | |
| 2015/0042664 A1* | 2/2015 | Currid | G06T 1/20 345/502 |
| 2015/0371355 A1* | 12/2015 | Chen | G06T 1/20 345/505 |

OTHER PUBLICATIONS

Lee et al, Securing KVM-based Cloud Systems via Virtualization Introspection, 2014, IEEE, 7th Hawaii International Conference on System Science, pp. 5028-5037.*

Allen M. Kay, "Intel Graphics Virtualization on KVM," KVM Forum 2011, Aug. 16, 2011, 18 pages, Internet linux-kvm.org/wiki/images/b/be/2011-forum-$graphics-direct-assignment.pdf>.

Allen Kay, "Graphics Virtualization Challenges," Intel Open Source Technology Center, Apr. 29, 2010, 9 pages, Internet slideshare.net/xen_com_mgr/graphics-virtualization>.

Lin Shi et al., "VCUDA: GPU-accelerated High-performance Computing in Virtual Machines," IEEE Transactions on Computers, 2011, 14 pages, Internet: cis.gvsu.edu/~fiskse/classes/cs658/hw/2012-02-16/vCUDA.pdf.

* cited by examiner

VIRTUAL SYSTEM DEVICE IDENTIFICATION USING GPU TO HOST BRIDGE MAPPING

TECHNICAL FIELD

The present disclosure is generally related to computer systems, and more particularly, to virtual system device identification in virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system (OS) of the host machine is typically referred to as the "host operating system." Typically, software on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system."

Physical devices, such as network devices or Peripheral Component Interconnect (PCI) cards with attached graphics processing units (GPUs), can be made available to guests by the hypervisor by a process known as device assignment. The hypervisor can create a virtual device within the guest that is associated with the physical device so that any access of the virtual device can be forwarded to the physical device by the hypervisor with little or no modification. In some cases, the hypervisor may present a GPU to a virtual machine as if directly connected. This is referred to as GPU pass-through.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
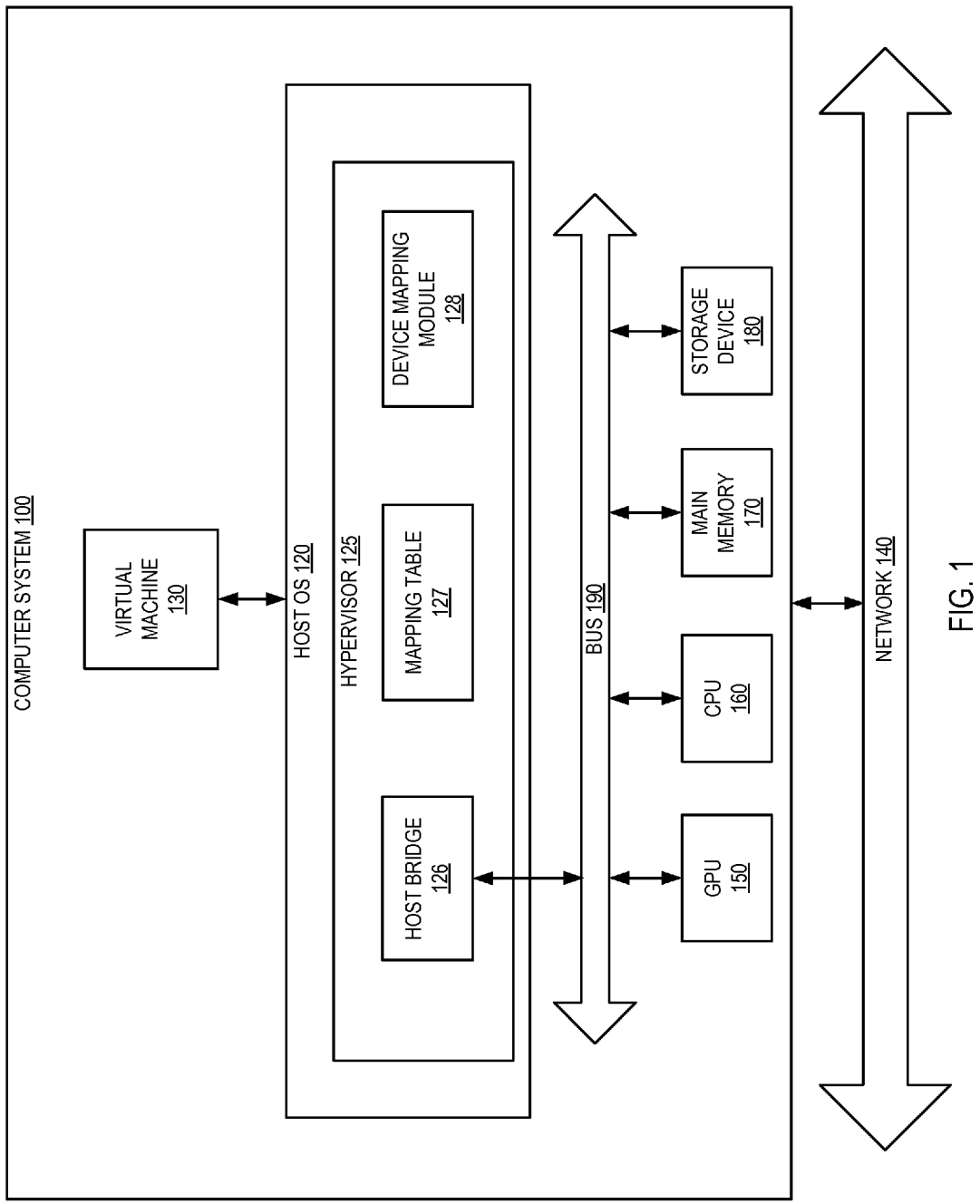
FIG. 1 depicts a high-level component diagram of an example computer system architecture, in accordance with one or more aspects of the present disclosure.

Described herein are methods and systems for GPU based virtual device identification. In a virtualized environment, the hypervisor may present a GPU to a virtual machine as if directly connected using GPU pass-through. A GPU can be included as part of a particular motherboard or graphics card. When utilizing GPU pass-through with a host bridge, successful device assignment and device driver selection may only occur if the GPU and host bridge are particular models from specific vendors. A host bridge can act as the gateway to a hardware device. When selecting the device driver selection for a GPU, the operating system may first read particular registers associated with the GPU to obtain vendor information and the device identifier. The operating system may then use this information to look up the device driver for that GPU.

However, in some cases where a host bridge is utilized, the operating system may access the host bridge to identify the correct driver for the GPU. This can cause significant problems when assigning a GPU if the host bridge and GPU are from different vendors. The operating system may select a driver based on the information from the host bridge, but the selected driver may not be compatible with the GPU. This can commonly arise in virtualized environments if a particular host bridge is in place and a particular GPU motherboard is added at a later time. Additionally, system security can be compromised if the hypervisor accesses the physical host bridge directly to obtain the necessary information for device driver assignment.

Aspects of the present disclosure address the above noted deficiencies by implementing GPU based virtual system device identification. The hypervisor can load a reverse mapping table that cross references known GPU and host bridge combinations. The hypervisor can identify the GPU, obtain the ID of the compatible host bridge using the reverse mapping table, and send the host bridge identifier to a virtual machine so that it may load a device driver that is compatible with the GPU. This can both eliminate the compatibility issues often encountered with GPU pass-through device assignment using a host bridge as well as improve system security since the hypervisor need not access the host bridge directly.

In an illustrative example, a hypervisor can receive a mapping table that maps a plurality of GPU device identifiers to a corresponding plurality of host bridge device identifiers. The mapping table can comprise a list of known GPU device identifiers with corresponding compatible host bridge device identifiers. The table can comprise known specifications for GPUs that ship on particular motherboards. The table may comprise a list of GPUs supported by the implemented hardware with the chipset supported by the GPU. The chipset may then be used to identify the host bridge identifier which may then be mapped to the GPU. In some implementations, the mapping table can be predefined by an administrator. Alternatively, the mapping table may be provided by hardware vendors that ship the GPU hardware.

The hypervisor may then load the table into hypervisor accessible memory. In some implementations, the table may be compiled into hypervisor code when the hypervisor is built. Alternatively, the table may be loaded into hypervisor memory from an outside source. For example, the table may be loaded from a configuration file, a data store, or in any similar manner. The hypervisor may load the table during hypervisor initialization, or alternatively, may load the table responsive to receiving a request from a virtual machine to access the host bridge to which the GPU is associated.

During initialization of a virtual machine to which the GPU may be assigned, the virtual machine may attempt to load drivers for all devices that will be assigned to it. To load the appropriate driver, the hypervisor may need to provide the appropriate host bridge identifier. The hypervisor may determine the host bridge identifier upon initialization of the virtual machine, upon a specific request sent by the virtual machine and received by the hypervisor, or upon detecting a hypervisor administrator request to assign the GPU to the virtual machine. Additionally, the hypervisor may determine the host bridge identifier upon receiving a request from the virtual machine to access the host bridge directly, since the host bridge is the virtual machine's gateway to the GPU.

The hypervisor may first identify the physical GPU device that is to be assigned to the virtual machine. Once identified, the hypervisor may then retrieve a GPU device identifier from the physical GPU device. The device identifier may indicate the GPU manufacturer, model number, or the like. Once the hypervisor identifies the GPU, it may then determine a host bridge device identifier that corresponds to the retrieved GPU identifier using the mapping table. By using the mapping table, the hypervisor may determine the host bridge identifier to provide to the virtual machine without accessing the host bridge directly. Once the hypervisor has identified a host bridge ID from the mapping table, it may then send the identifier to the virtual machine. The virtual machine, can receive the host bridge identifier, determine the appropriate device driver associated with the received host bridge identifier, and subsequently load the device driver to access the assigned GPU. The hypervisor may then assign the GPU to the virtual machine.

Aspects of the present disclosure are thus capable of facilitating GPU based virtual system device identification by providing the host bridge identifier to the virtual machine without having to access the host bridge directly. More particularly, aspects of the present disclosure can eliminate device driver malfunction due to discrepancies between host bridge compatible drivers and GPU compatible drivers. Moreover, system security can be enhanced because the hypervisor need not access the host bridge directly.

FIG. 1 depicts a high-level component diagram of an illustrative example of a computer system 100, in accordance with one or more aspects of the present disclosure. One skilled in the art will appreciate that other architectures for computer system 100 are possible, and that the implementation of a computer system utilizing examples of the invention are not necessarily limited to the specific architecture depicted by FIG. 1.

As shown in FIG. 1, the computer system 100 is connected to a network 140 and comprises one or more graphics processing units (GPU) 150, central processing units (CPU) 160, main memory 170, which may include volatile memory devices (e.g., random access memory (RAM)), non-volatile memory devices (e.g., flash memory) and/or other types of memory devices, and storage device 180 (e.g., one or more magnetic hard disk drives, a Peripheral Component Interconnect [PCI] solid state drive, a Redundant Array of Independent Disks [RAID] system, a network attached storage [NAS] array, etc.), connected by a bus 190 (e.g., a Peripheral Component Interconnect [PCI] bus, a Universal Serial Bus [USB], etc.). In certain implementations, main memory 170 may be non-uniform access (NUMA), such that memory access time depends on the memory location relative to CPU 160.

The computer system 100 may be a server, a mainframe, a workstation, a personal computer (PC), a mobile phone, a palm-sized computing device, etc. The network 140 may be a private network (e.g., a local area network (LAN), a wide area network (WAN), intranet, etc.) or a public network (e.g., the Internet).

It should be noted that although, for simplicity, a single CPU is depicted in FIG. 1, in some other embodiments computer system 100 may comprise a plurality of CPUs. Similarly, in some other embodiments computer system 100 may comprise a plurality of storage devices 180, rather than a single storage device 180. Moreover, in some other embodiments computer system 100 may comprise a plurality of GPUs 150, rather than a single GPU 150.

Computer system 100 may additionally comprise one or more virtual machine (VM) 130 and host operating system (OS) 120. VM 130 is a software implementation of a machine that executes programs as though they were actual physical machines. Host OS 120 manages the hardware resources of the computer system and provides functions such as inter-process communication, scheduling, memory management, and so forth.

VM 130 may comprise a guest operating system (OS) (not shown) that handles the execution of applications within the virtual machine. It should be noted that although, for simplicity, a single VM 130 is depicted in FIG. 1, computer system 100 may host a plurality VMs 130.

Host OS 120 may comprise a hypervisor 125, which provides a virtual operating platform for VM 130 and manages its execution. In an illustrative example, hypervisor 125 may include or expose to VM 130 a host bridge 126 (e.g., a PCI bridge device, etc.) that may be a physical device or a virtual device, and that may have a set of slots (e.g., PCI express slots, etc.), and that may be capable of converting individual data items pertaining to multiple read and/or write transactions on bus 190 into one larger set of data. Hypervisor 125 may also include mapping table 127 and device mapping module 128. It should be noted that in some alternative implementations, hypervisor 125 may be external to host OS 120, rather than embedded within host OS 120, or may replace host OS 120.

Device mapping module 128 can facilitate GPU based virtual system device identification for a GPU 150 to be assigned to VM 130 using the mapping information stored in mapping table 127, as described in detail below with respect to FIGS. 2-3. Mapping table 127 can be an area of memory accessible to device mapping module 128 or a data structure saved in storage device 180.

Figure 2:
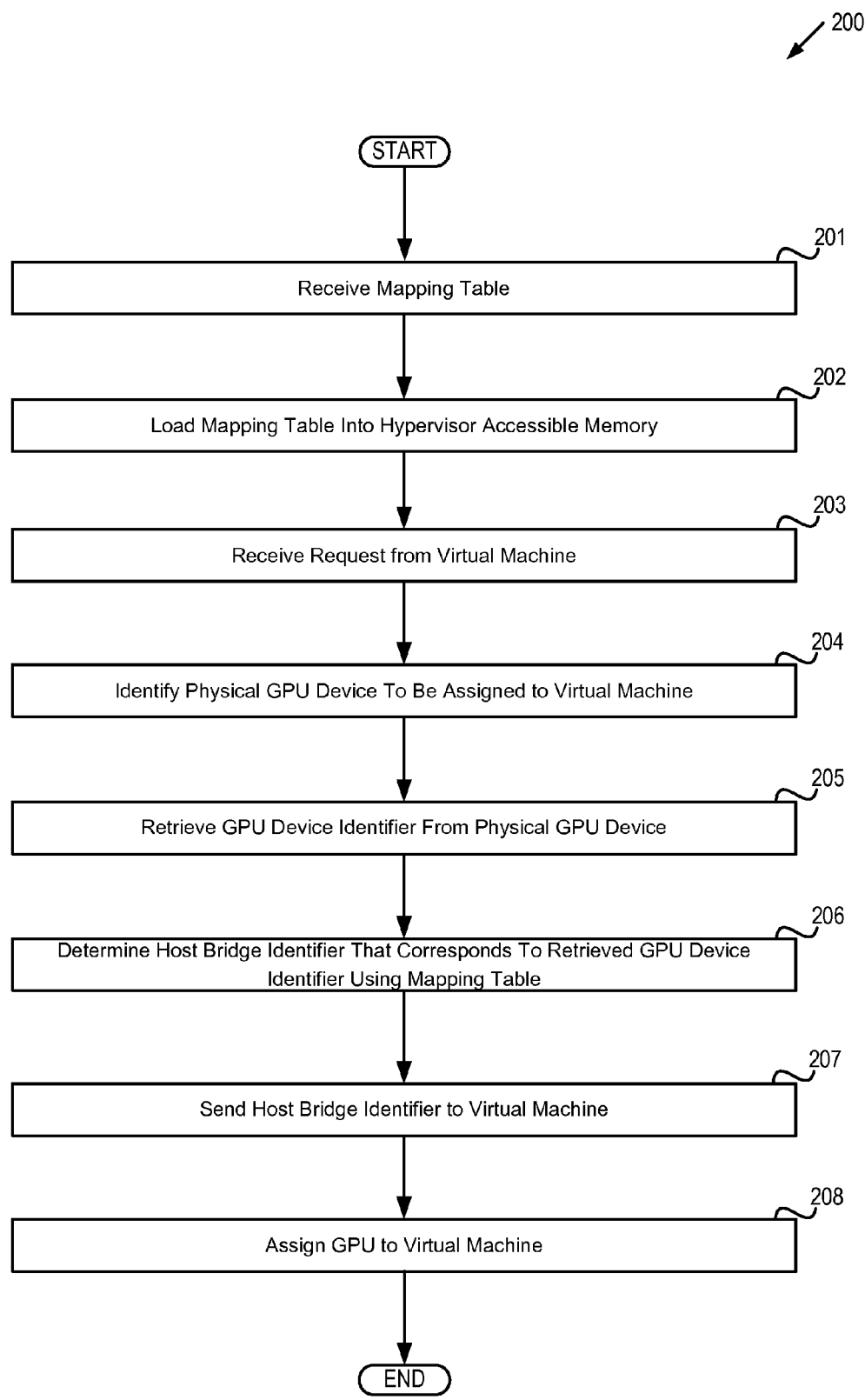
FIG. 2 depicts a flow diagram of a method for determining a host bridge identifier from an associated GPU in response to a request from a VM, in accordance with one or more aspects of the present disclosure.

FIG. 2 depicts a flow diagram of an example method 200 for determining a host bridge identifier from an associated GPU in response to a request from a VM. The method may be performed by processing logic that may comprise hardware (circuitry, dedicated logic, etc.), software (such as is run on a general purpose computer system or a dedicated machine), or a combination of both. In one illustrative example, method 200 may be performed by device mapping module 128 of hypervisor 125 in FIG. 1. Alternatively, some or all of method 200 might be performed by another module or machine. It should be noted that blocks depicted in FIG. 2 could be performed simultaneously or in a different order than that depicted.

At block 201, processing logic receives a mapping table that maps a plurality of GPU device identifiers to a corresponding plurality of host bridge device identifiers. The mapping table can comprise a list of known GPU devices identifiers with corresponding compatible host bridge device identifiers. The table can comprise known specifications for GPUs that ship on particular motherboards. The table may comprise a list of GPUs supported by the implemented hardware with the chipset supported by the GPU. The chipset may then be used to identify the host bridge identifier which may then be mapped to the GPU. In some implementations, the mapping table can be predefined by an administrator. Alternatively, the mapping table may be provided by hardware vendors that ship the GPU hardware.

At block 202, processing logic loads the mapping table into hypervisor accessible memory. In some implementations, the table may be compiled into hypervisor code when the hypervisor is built. Alternatively, the table may be loaded into hypervisor memory from an outside source. For example, the table may be loaded from a configuration file, a data store, or in any similar manner. At block 203, processing logic receives a request from the virtual machine. The received request may be a request to directly access the host bridge to which the GPU is associated. Alternatively, the request from the virtual machine may be an explicit request to provide the host bridge identifier.

At block 204, processing logic can identify the physical GPU device that is to be assigned to the virtual machine. At block 205, processing logic can retrieve a GPU device identifier from the physical GPU device. The device identifier may indicate the GPU manufacturer, model number, or the like. At block 206, processing logic may then determine a host bridge device identifier that corresponds to the retrieved GPU identifier using the mapping table. By using the mapping table, processing logic may determine the host bridge identifier to provide to the virtual machine without accessing the host bridge directly. At block 207, processing logic may send the identifier to the virtual machine. At block 208, processing logic may assign the GPU to the virtual machine. After block 208, the method of FIG. 2 terminates.

Figure 3:
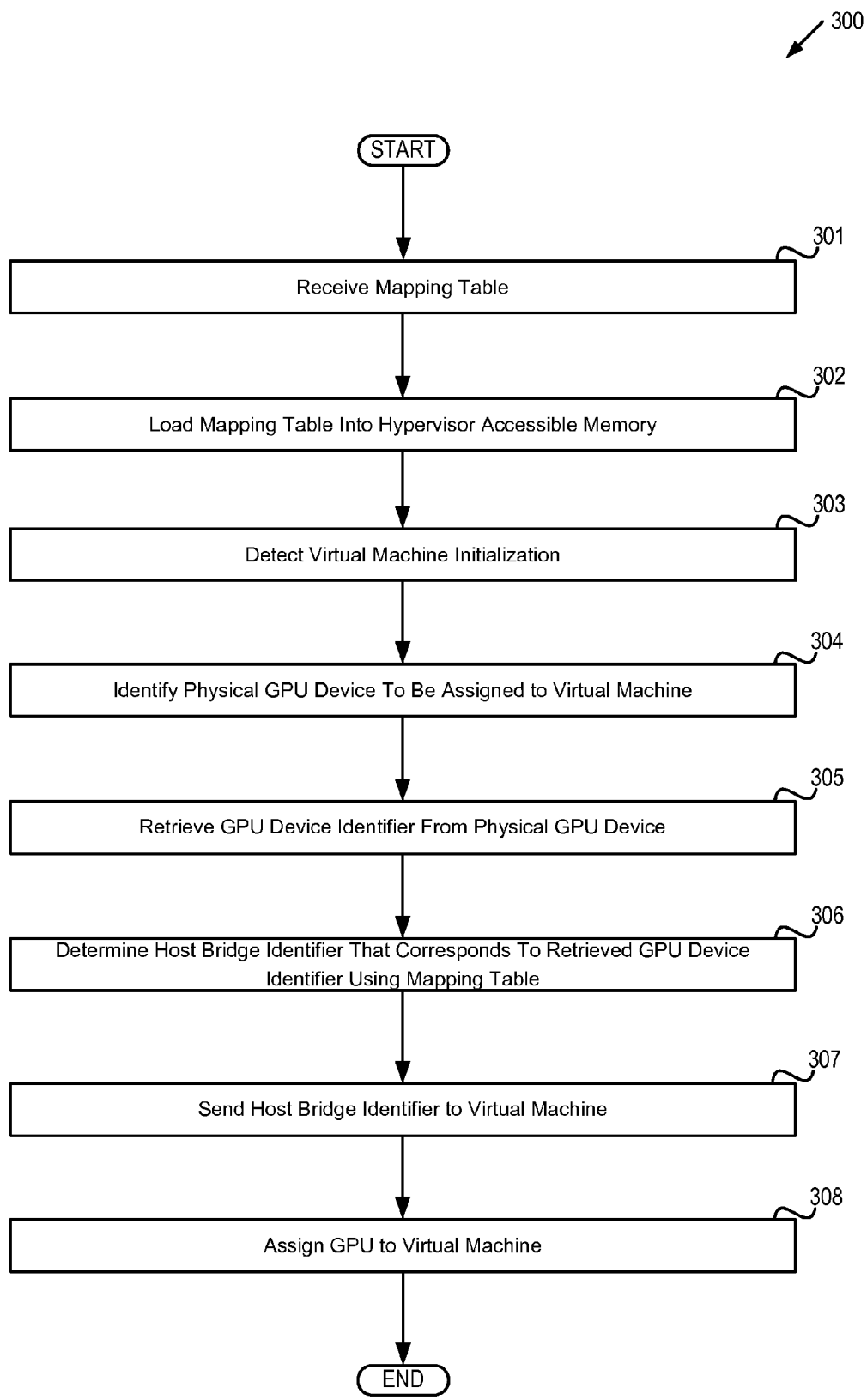
FIG. 3 depicts a flow diagram of a method for determining a host bridge identifier from an associated GPU in response to VM initialization, in accordance with one or more aspects of the present disclosure.

FIG. 3 depicts a flow diagram of an example method 300 for determining a host bridge identifier from an associated GPU in response to VM initialization. The method may be performed by processing logic that may comprise hardware (circuitry, dedicated logic, etc.), software (such as is run on a general purpose computer system or a dedicated machine), or a combination of both. In one illustrative example, method 300 may be performed by device mapping module 128 of hypervisor 125 in FIG. 1. Alternatively, some or all of method 300 might be performed by another module or machine. It should be noted that blocks depicted in FIG. 3 could be performed simultaneously or in a different order than that depicted.

At block 301, processing logic receives a mapping table that maps a plurality of GPU device identifiers to a corresponding plurality of host bridge device identifiers. The mapping table can comprise a list of known GPU devices identifiers with corresponding compatible host bridge device identifiers. The table can comprise known specifications for GPUs that ship on particular motherboards. The table may comprise a list of GPUs supported by the implemented hardware with the chipset supported by the GPU. The chipset may then be used to identify the host bridge identifier which may then be mapped to the GPU. In some implementations, the mapping table can be predefined by an administrator. Alternatively, the mapping table may be provided by hardware vendors that ship the GPU hardware.

At block 302, processing logic loads the mapping table into hypervisor accessible memory. In some implementations, the table may be compiled into hypervisor code when the hypervisor is built. Alternatively, the table may be loaded into hypervisor memory from an outside source. For example, the table may be loaded from a configuration file, a data store, or in any similar manner. At block 303, processing logic detects initialization of a virtual machine. The received request may be a request to directly access the host bridge to which the GPU is associated. Alternatively, the request from the virtual machine may be an explicit request to provide the host bridge identifier.

At block 304, processing logic can identify the physical GPU device that is to be assigned to the virtual machine. At block 305, processing logic can retrieve a GPU device identifier from the physical GPU device. The device identifier may indicate the GPU manufacturer, model number, or the like. At block 306, processing logic may then determine a host bridge device identifier that corresponds to the retrieved GPU identifier using the mapping table. By using the mapping table, processing logic may determine the host bridge identifier to provide to the virtual machine without accessing the host bridge directly. At block 307, processing logic may send the identifier to the virtual machine. At block 308, processing logic may assign the GPU to the virtual machine. After block 308, the method of FIG. 3 terminates.

Figure 4:
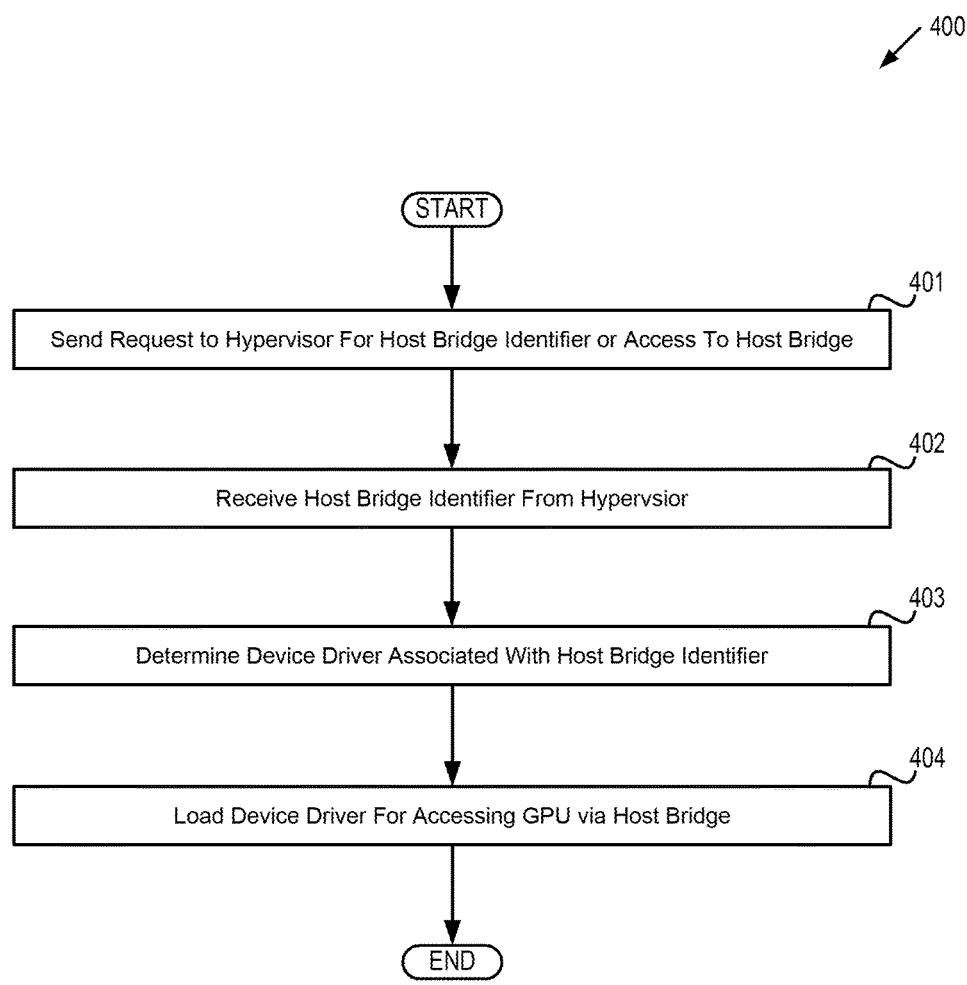
FIG. 4 depicts a flow diagram of a method for loading a GPU compatible device driver for an associated host bridge by a virtual machine, in accordance with one or more aspects of the present disclosure.

FIG. 4 depicts a flow diagram of an example method 400 for loading a GPU compatible device driver for an associated host bridge by a virtual machine. The method may be performed by processing logic that may comprise hardware (circuitry, dedicated logic, etc.), software (such as is run on a general purpose computer system or a dedicated machine), or a combination of both. In one illustrative example, method 400 may be performed by a guest operating system of virtual machine 130 in FIG. 1. Alternatively, some or all of method 400 might be performed by another module or machine. It should be noted that blocks depicted in FIG. 4 could be performed simultaneously or in a different order than that depicted.

At block 401, processing logic sends a request to the hypervisor. The request can be a specific request for the host bridge identifier to which the virtual machine requires access. Alternatively, the request can be a request to access the host bridge itself. At block 402, processing logic receives a host bridge identifier from the hypervisor. At block 403, processing logic determines the device driver associated with the host bridge identifier. At block 404, processing logic loads the device driver from block 403 for accessing the GPU via the host bridge. After block 404, the method of FIG. 4 terminates.

Figure 5:
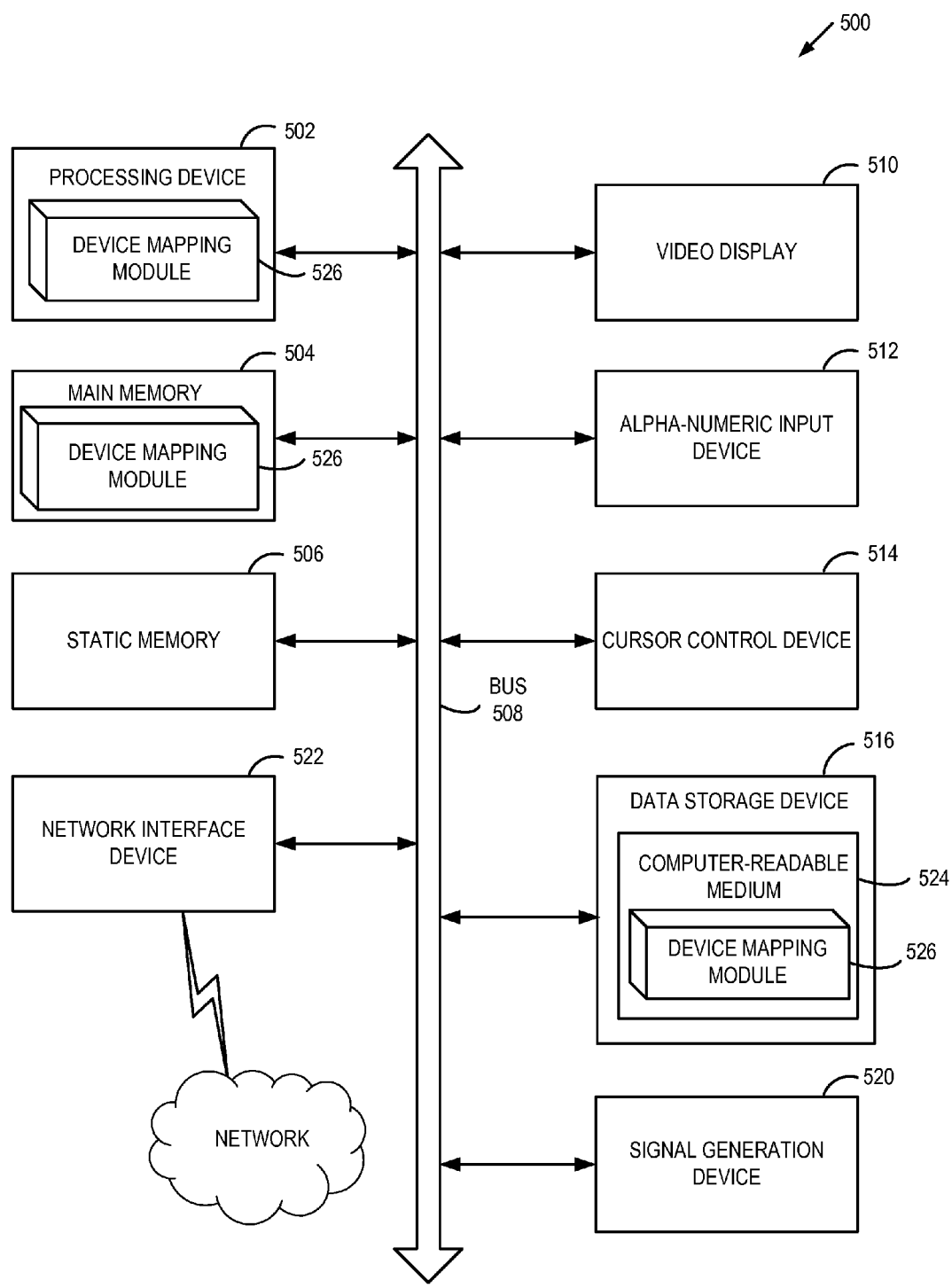
FIG. 5 depicts a block diagram of an illustrative computer system operating in accordance with examples of the invention.

FIG. 5 depicts an example computer system 500 which can perform any one or more of the methods described herein. In one example, computer system 500 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute packet filtering module 526 for performing the operations and steps discussed herein (e.g., corresponding to the methods of FIGS. 3-4, etc.).

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker). In one illustrative example, the video display unit 510, the alphanumeric input device 512, and the cursor control device 514 may be combined into a single component or device (e.g., an LCD touch screen).

The data storage device 516 may include a computer-readable medium 524 on which is stored device mapping module 526 (e.g., corresponding to the methods of FIGS. 2-4, etc.) embodying any one or more of the methodologies or functions described herein. Device mapping module 526 may also reside, completely or at least partially, within the main memory 504 and/or within the processing device 502 during execution thereof by the computer system 500, the main memory 504 and the processing device 502 also constituting computer-readable media. Device mapping module 526 may further be transmitted or received over a network via the network interface device 522.

While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "sending," "determining," "identifying," "loading," "retrieving," "assigning," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
    loading, by a processing device executing a hypervisor, a mapping table into hypervisor accessible memory, the mapping table comprising a plurality of entries, wherein each entry maps a graphics processing unit (GPU) device identifier to a corresponding compatible host bridge device identifier;
    identifying a physical GPU device accessible by the hypervisor to be assigned to a virtual machine;
    retrieving a first GPU device identifier from the physical GPU device;
    determining, by the processing device executing the hypervisor, a first compatible host bridge device identifier that corresponds to the retrieved first GPU device identifier using the mapping table; and
    providing, by the processing device, the first compatible host bridge device identifier to the virtual machine to cause the virtual machine to load a device driver associated with the first compatible host bridge device identifier for accessing the physical GPU device.

2. The method of claim 1, further comprising:
    receiving a request from the virtual machine to access a host bridge;
    sending the first compatible host bridge identifier to the virtual machine; and
    assigning the physical GPU device to the virtual machine.

3. The method of claim 2, wherein loading the mapping table into hypervisor accessible memory comprises loading the mapping table responsive to receiving the request from the virtual machine to access the host bridge.

4. The method of claim 1, wherein loading the mapping table into hypervisor accessible memory comprises loading the mapping table during hypervisor initialization.

5. The method of claim 2, wherein determining the first compatible host bridge identifier comprises determining the first compatible host bridge identifier without accessing the host bridge directly.

6. The method of claim 2, wherein determining the first compatible host bridge device identifier comprises determining the first compatible host bridge device identifier responsive to at least one of receiving the request from the virtual machine to access the host bridge, starting the virtual machine, or detecting a request to assign the GPU to the virtual machine.

7. The method of claim 2, wherein a guest operating system of the virtual machine is to:
    send the request to the hypervisor to access the host bridge;
    receive the first compatible host bridge identifier from the hypervisor;
    determine the device driver associated with the received first compatible host bridge identifier in view of a lookup operation using the first compatible host bridge identifier; and
    load the device driver for accessing the assigned physical GPU device.

8. A computing apparatus comprising:
    a memory; and
    a processing device, operatively coupled to the memory, to execute a hypervisor to:
        identify a physical graphics processing unit (GPU) device accessible by the hypervisor to be assigned to a virtual machine;
        retrieve a first GPU device identifier from the physical GPU device;
        determine a first compatible host bridge device identifier that corresponds to the retrieved first GPU device identifier using a mapping table comprising a plurality of entries, wherein each entry maps a GPU device identifier to a corresponding compatible host bridge device identifier; and
        provide the first compatible host bridge device identifier to the virtual machine to cause the virtual machine to load a device driver associated with the first compatible host bridge device identifier for accessing the physical GPU device.

9. The apparatus of claim 8, wherein the processing device is further to:
    load the mapping table into hypervisor accessible memory;
    receive a request from the virtual machine to access a host bridge;
    send the first compatible host bridge identifier to the virtual machine; and
    assign the physical GPU device to the virtual machine.

10. The apparatus of claim 9, wherein to load the mapping table, the processing device is to load the mapping table responsive to receiving the request from the virtual machine to access the host bridge.

11. The apparatus of claim 9, wherein to load the mapping table, the processing device is to load the mapping table during hypervisor initialization.

12. The apparatus of claim 9, wherein to determine the first compatible host bridge identifier, the processing device is to determine the first compatible host bridge identifier without accessing the host bridge directly.

13. The apparatus of claim 9, wherein to determine the first compatible host bridge identifier, the processing device is to determine the first compatible host bridge identifier responsive to at least one of receiving the request from the virtual machine to access the host bridge, starting the virtual machine, or detecting a request to assign the physical GPU device to the virtual machine.

14. The apparatus of claim 9, wherein a guest operating system of the virtual machine is to:

send the request to the hypervisor to access the host bridge;
receive the first compatible host bridge identifier from the hypervisor;
determine the device driver associated with the received first compatible host bridge identifier in view of a lookup operation using the first compatible host bridge identifier; and
load the device driver for accessing the assigned physical GPU device.

15. A non-transitory computer readable storage medium, having instructions stored therein, which when executed by a processing device of a computer system, cause the processing device to:

load, by the processing device executing a hypervisor, a mapping table into hypervisor accessible memory, the mapping table comprising a plurality of entries, wherein each entry maps a graphics processing unit (GPU) device identifier to a corresponding compatible host bridge device identifier;
receive a request from a virtual machine to access a host bridge;
identify a physical GPU device accessible by the hypervisor to be assigned to the virtual machine;
retrieve a first GPU device identifier from the physical GPU device;
determine, by the processing device executing hypervisor, a first compatible host bridge device identifier that corresponds to the retrieved first GPU device identifier using the mapping table;
send the first host bridge identifier to the virtual machine to cause the virtual machine to load a device driver associated with the first compatible host bridge device identifier for accessing the physical GPU device; and
assign the physical GPU device to the virtual machine.

16. The non-transitory computer readable storage medium of claim 15, wherein to load the mapping table, the processing device is to load the mapping table responsive to receiving the request from the virtual machine to access the host bridge.

17. The non-transitory computer readable storage medium of claim 15, wherein to load the mapping table, the processing device is to load the mapping table during hypervisor initialization.

18. The non-transitory computer readable storage medium of claim 15, wherein to determine the first compatible host bridge identifier, the processing device is to determine the first compatible host bridge identifier without accessing the host bridge directly.

19. The non-transitory computer readable storage medium of claim 18, wherein to determine the first compatible host bridge identifier, the processing device is to determine the first compatible host bridge identifier responsive to at least one of receiving the request from the virtual machine to access the host bridge, starting the virtual machine, or detecting a request to assign the GPU to the virtual machine.

20. The non-transitory computer readable storage medium of claim 18, wherein a guest operating system of the virtual machine is to:

send the request to the hypervisor to access the host bridge;
receive the first compatible host bridge identifier from the hypervisor;
determine the device driver associated with the received first compatible host bridge identifier in view of a lookup operation using the first compatible host bridge identifier; and
load the device driver for accessing the assigned physical GPU device.

* * * * *